US012779343B2

(12) United States Patent
Liu

(10) Patent No.: US 12,779,343 B2
(45) Date of Patent: Nov. 3, 2026

(54) USER MATCHING METHOD AND APPARATUS, ELECTRONIC DEVICE, AND STORAGE MEDIUM

(71) Applicant: Tencent Technology (Shenzhen) Company Limited, Shenzhen (CN)

(72) Inventor: Zhihong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 278 days.

(21) Appl. No.: 18/379,588

(22) Filed: Oct. 12, 2023

(65) Prior Publication Data

US 2024/0042332 A1 Feb. 8, 2024

Related U.S. Application Data

(63) Continuation of application No. PCT/CN2022/135208, filed on Nov. 30, 2022.

(30) Foreign Application Priority Data

Dec. 2, 2021 (CN) ......................... 202111467722.4
Dec. 28, 2021 (CN) ......................... 202111631120.8

(51) Int. Cl.
*A63F 13/795* (2014.01)
*A63F 13/798* (2014.01)

(52) U.S. Cl.
CPC .......... *A63F 13/795* (2014.09); *A63F 13/798* (2014.09)

(58) Field of Classification Search
None
See application file for complete search history.

(56) References Cited

U.S. PATENT DOCUMENTS

2011/0055135 A1 3/2011 Dawson et al.
2013/0344967 A1* 12/2013 Kajii .................... A63F 13/795 463/42

(Continued)

FOREIGN PATENT DOCUMENTS

CN 108066989 A 5/2018
CN 111773735 A 10/2020

(Continued)

OTHER PUBLICATIONS

Espacenet, WO2022088790A1, https://worldwide.espacenet.com/publication Details/biblio?CC=WO&NR=2022088790A1&KC=A1& FT=D&ND=4&date=20220505&DB=EPODOC&locale=en_EP, pp. 1-58 (Year: 2025).*

(Continued)

*Primary Examiner* — Tramar Harper
(74) *Attorney, Agent, or Firm* — Morgan, Lewis & Bockius LLP

(57) ABSTRACT

This application discloses a teammate matching method performed by an electronic device. The method includes: displaying a team forming interface associated with a first account of a player team of a virtual game; obtaining, among at least one second account, at least one target account whose account information meets a preset teammate matching condition, the account information including a login state, a game progress state, and a matching degree of the at least one target account with the first account; displaying at least one invitation interface corresponding to the at least one target account for the first account to invite the target account to join the player team; and in response to the invitation interface being triggered by the first account, transmitting invitation information to the at least one target account to join the player team.

15 Claims, 9 Drawing Sheets

(56) References Cited

U.S. PATENT DOCUMENTS

| | | | | |
|---|---|---|---|---|
| 2014/0274358 | A1* | 9/2014 | Hoskins | A63F 13/87 463/29 |
| 2014/0274404 | A1* | 9/2014 | Hoskins | A63F 13/335 463/42 |
| 2014/0358945 | A1* | 12/2014 | Xie | G06F 16/907 707/758 |
| 2015/0057084 | A1* | 2/2015 | Lin | A63F 13/352 463/42 |
| 2016/0005270 | A1* | 1/2016 | Marr | G07F 17/3255 463/25 |
| 2022/0305390 | A1* | 9/2022 | Tripathi | A63F 13/795 |
| 2023/0364516 | A1* | 11/2023 | Zheng | A63F 13/795 |

FOREIGN PATENT DOCUMENTS

| | | | |
|---|---|---|---|
| CN | 111888769 | A | 11/2020 |
| CN | 112138388 | A | 12/2020 |
| CN | 112148393 | A | 12/2020 |
| CN | 112704883 | A | 4/2021 |
| CN | 112717421 | A | 4/2021 |
| CN | 113368506 | A | 9/2021 |
| CN | 113413615 | A | 9/2021 |
| CN | 114470792 | A | 5/2022 |
| JP | 2011101775 | A | 5/2011 |
| JP | 2014147589 | A | 8/2014 |
| JP | 2016010590 | A | 1/2016 |
| JP | 2018010590 | A | 1/2018 |
| JP | 2021168755 | A | 10/2021 |
| WO | WO 2017018239 | A1 | 2/2017 |

OTHER PUBLICATIONS

Tencent Technology, Japanese Office Action, JP Patent Application No. 2024-514491, Jun. 5, 2025, 14 pgs.

Tencent Technology, Japanese Office Action, JP Patent Application No. 2024-514491, Feb. 25, 2025, 10 pgs.

Square-Enix.com, "Final Fantasy XI: Rise of the Zilart", For Windows, Playing Manual 2005, Retrieved from the Internet: https://support.na.square-enix.com/manual.php?id=20&la=1.

Tencent Technology, WO, PCT/CN2022/135208, Feb. 20, 2023, 5 pgs.

Tencent Technology, IPRP, PCT/CN2022/135208, May 2, 2024, 6 pgs.

Tencent Technology, ISR, PCT/CN2022/135208, Feb. 20, 2023, 3 pgs.

* cited by examiner

USER MATCHING METHOD AND APPARATUS, ELECTRONIC DEVICE, AND STORAGE MEDIUM

CROSS-REFERENCE TO RELATED APPLICATIONS

This application is a continuation application of PCT Patent Application No. PCT/CN2022/135208, entitled "USER MATCHING METHOD AND APPARATUS, ELECTRONIC DEVICE, AND STORAGE MEDIUM" filed on Nov. 30, 2022, which (i) claims priority to Chinese Patent Application No. 202111467722.4, entitled "TEAM MATCHING METHOD, STORAGE MEDIUM, AND ELECTRONIC DEVICE" filed with the China National Intellectual Property Administration on Dec. 2, 2021, and (ii) claims priority to Chinese Patent Application No. 202111631120.8, entitled "TEAM MATCHING METHOD, STORAGE MEDIUM, AND ELECTRONIC DEVICE" filed with the China National Intellectual Property Administration on Dec. 28, 2021, all of which are incorporated herein by reference in their entireties.

FIELD OF THE INVENTION

This application relates to the computer field, and in particular, to a user matching method and apparatus, an electronic device, and a storage medium.

BACKGROUND OF THE INVENTION

In recent years, the development of team-based virtual games is increasingly rapid, because this mode of team cooperation can better stimulate players' interest in participation. Team cooperation often requires a plurality of accounts for team forming. At present, during team forming, a player usually browses users associated with the player (for example, a friend list in a game platform), selects one or more from the users, and transmits a team invitation to the users.

SUMMARY

Embodiments of this application provides a teammate matching method and apparatus, a storage medium, and an electronic device, to resolve at least one technical problem in the related art when users are forming a team.

According to one aspect of the embodiments of this application, a teammate matching method is performed by an electronic device, including: displaying a team forming interface associated with a first account of a player team of a virtual game; obtaining, among at least one second account, at least one target account whose account information meets a preset teammate matching condition, the account information comprising at least one of the following: a login state of the at least one target account, a game progress state of the at least one target account, and a matching degree of the at least one target account with the first account; displaying at least one invitation interface corresponding to the at least one target account for the first account to invite the target account to join the player team; and in response to the invitation interface being triggered by the first account, transmitting invitation information to the at least one target account to join the player team.

According to another aspect of the embodiments of this application, an electronic device is further provided. The electronic device includes a memory, a processor, and a computer program stored on the memory that, when executed on the processor. causes the electronic device to perform the foregoing user matching method through the computer program.

According to yet another aspect of the embodiments of this application, a non-transitory computer-readable storage medium, comprises a stored computer program. The computer program, when executed by a processor of an electronic device, causes the electronic device to perform the foregoing user matching method through the computer program.

In the embodiments of this application, when a user joins a player team, the electronic device screens out a target account suitable for forming a team with the user according to a preset matching condition, and provides the target account to the user through an invitation interface, and the user directly invites the corresponding target account to join the player team by operating the invitation interface. This automatic user matching solution can reduce the need for the user to manually browse the friend list and select and invite users, and improve the intelligence and usability of the virtual game system.

BRIEF DESCRIPTION OF THE DRAWINGS

The accompanying drawings described herein are used to provide a further understanding of this application, and form part of this application. Exemplary embodiments of this application and descriptions thereof are used to explain this application, and do not constitute any inappropriate limitation to this application. In the accompanying drawings.

DESCRIPTION OF EMBODIMENTS

To make a person in the art understand the solutions in the embodiments of this application better, the following clearly and completely describes the technical solutions in the embodiments of this application with reference to the accompanying drawings in the embodiments of this application. Apparently, the described embodiments are only some embodiments rather than all the embodiments of this application. All other embodiments obtained by a person of ordinary skill in the art based on the embodiments of this application without creative efforts shall fall within the protection scope of this application.

In the specification, claims, and the foregoing accompanying drawings of the present disclosure, the terms "first", "second", and so on are intended to distinguish between similar objects rather than indicating a specific order. It is to be understood that such used data is interchangeable where appropriate so that the embodiments of this application described here can be implemented in an order other than those illustrated or described here. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 1:
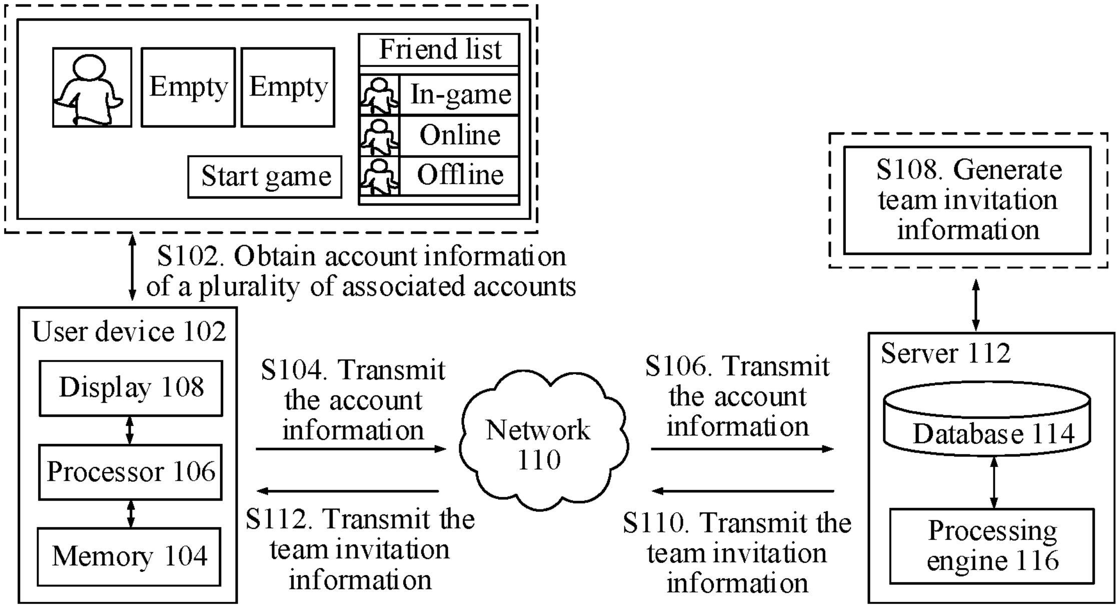
FIG. 1 is a schematic diagram of an application environment of a user matching method according to an embodiment of this application.

According to one aspect of the embodiments of this application, a user matching method is provided. As an implementation, the user matching method may be but is not limited to applied to an environment shown in FIG. 1. The environment may include but is not limited to a user device 102, a network 110, and a server 112. The user device 102 may include but is not limited to a display 108, a processor 106, and a memory 104. As shown in FIG. 1, the user matching method of the embodiments may include the following steps.

Step S102. The user device 102 obtains account information of a plurality of associated accounts (second accounts) having a friend relationship (association relationship) with a user account (first account), for example, a plurality of accounts displayed in a friend list, and each account corresponds to a current account state (in-game, online, offline, or the like). The account information may include, but is not limited to, the account state.

Steps S104 to S106. The user device 102 transmits the account information to the server 112 through the network 110.

Step S108. The server 112 finds a team invitation condition corresponding to the account information through a database 114, and performs matching processing between each piece of account information and the team invitation condition through a processing engine 116, to determine a target account whose account information meets the team invitation condition from the plurality of associated accounts, and generate team invitation information matching the target account;

Steps S110-S112. The server 112 transmits the team invitation information to the user device 102 through the network 110, and the processor 106 in the user device 102 displays the team invitation information on the display 108 and stores the team invitation information in the memory 104.

In addition to the example shown in FIG. 1, the foregoing steps may be independently completed by the user device 102, that is, the user device 102 performs the steps of determining a target account whose account information meets a team invitation condition from a plurality of associated accounts, generating team invitation information matching the target account, and the like, to reduce the processing pressure of the server. The user device 102 includes but is not limited to a handheld device (such as a mobile phone), a notebook computer, a desktop computer, an in-vehicle device, and the like. This application does not limit the specific implementation of the user device 102.

Similarly, in addition to the example shown in FIG. 1, some of the foregoing steps can also be performed by the server 112. For example, the user device 102 obtains a trigger signal that the user account is in a target queue to trigger the execution of the method. Therefore, in the description herein, the electronic device performing the method of the embodiments may refer to a user device, a server, or any other suitable device.

Figure 2A:
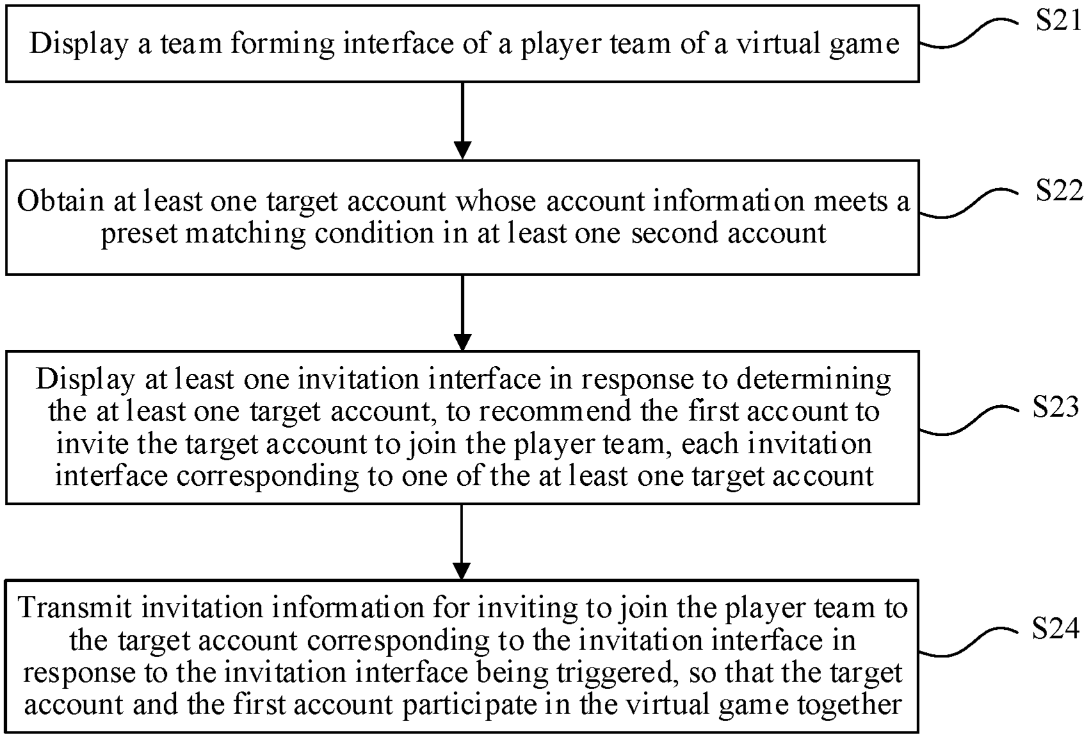
FIG. 2A is a schematic flowchart of a user matching method according to an embodiment of this application.

FIG. 2A is a schematic flowchart of a user matching method according to an embodiment of this application. As shown in FIG. 2A, the method may include the following steps.

Step S21. Display a team forming interface of a player team of a virtual game.

The player team includes at least two accounts participating in the virtual game together. The team forming interface is an interface used for displaying joined members and vacant seats in the player team in a player assembly stage before a game starts.

Step S22. Obtain at least one target account whose account information meets a preset matching condition in at least one second account.

The account information includes at least one of the following: a login state, a game progress state, and a matching degree with the first account. The matching degree with the first account refers to a matching degree of an account with the first account from the perspective of preset information (also referred to as target information).

In some embodiments, the obtaining of the target account may be performed in response to the first account being in the player team. The first account being in the player team means that the first account becomes a member of the player team. The first account being in the player team may include, for example, that the first account creates the player team and becomes a member of the player team, or that the first account joins the player team created by another account. In some other embodiments, the obtaining of the target account may be performed in response to determining that at least one vacant seat exists in the player team.

Step S23. Display at least one invitation interface corresponding to the at least one target account in response to determining the at least one target account, to recommend the first account to invite the target account to join the player team.

In some embodiments, when the invitation interface is displayed, text information can also be displayed to prompt the user of the first account, and the system recommends to invite the target account to join the player team to which the user belongs.

Step S24. Transmit invitation information for inviting to join the player team to the target account corresponding to the invitation interface in response to the invitation interface being triggered, so that the target account and the first account participate in the virtual game together.

When the method is performed by the user device, some steps may require the participation of the server. For example, when determining the target account, the user device can transmit information about the first account (and in some embodiments, the preset matching condition) to the server, to query the server for the target account meeting the matching condition. In another example, when the invitation information is transmitted to the target account, the user device can transmit the information about the target account to the server and transmit the invitation information to the target account through the server.

When the method is performed by the server, some steps may require the participation of the user device. For example, the team forming interface may be displayed through the user device. In another example, when the invitation interface is triggered, the user device transmits the trigger event to the server.

Figure 2B:
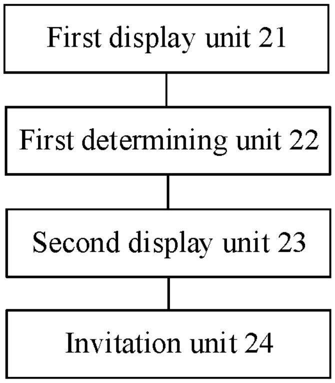
FIG. 2B is a schematic diagram of a user matching apparatus according to an embodiment of this application.
Figure 2C:
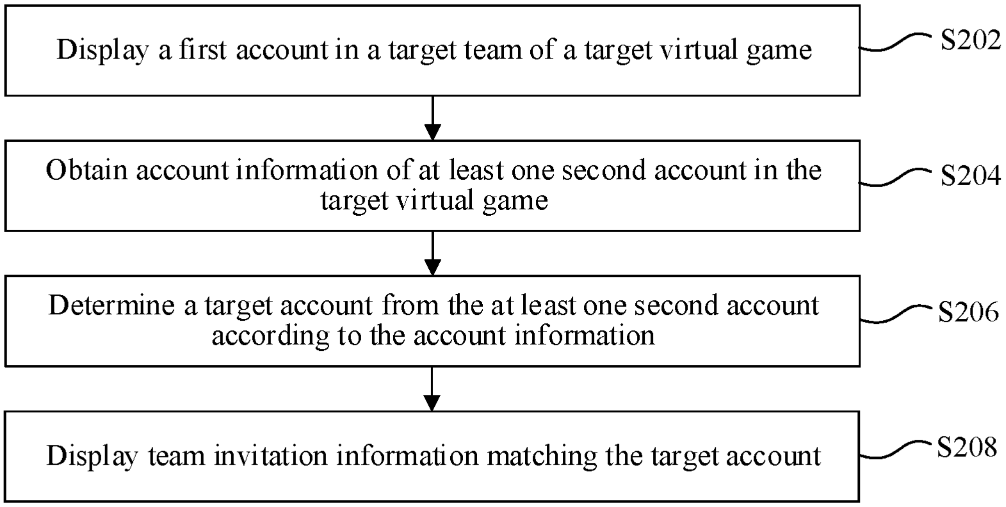
FIG. 2C is a schematic flowchart of a user matching method according to an embodiment of this application.

FIG. 2B is a schematic diagram of a user matching apparatus according to an embodiment of this application. The apparatus may be implemented by an electronic device. As shown in FIG. 2B, the apparatus may include the following components.

- a first display unit 21, configured to display a team forming interface of a player team of a virtual game, the player team including at least two accounts participating in the virtual game together;
- a first determining unit 22, configured to obtain at least one target account whose account information meets a preset matching condition in at least one second account, the account information including at least one of the following: a login state, a game progress state, and a matching degree with the first account;
- a second display unit 23, configured to display at least one invitation interface corresponding to the at least one target account in response to determining the at least one target account, to recommend the first account to invite the target account to join the player team; and
- an invitation unit 24, configured to transmit invitation information for inviting to join the player team to the target account corresponding to the invitation interface in response to the invitation interface being triggered, so that the target account and the first account participate in the virtual game together.

In this way, when a user joins a player team, the electronic device screens out a target account suitable for forming a team with the user according to a preset matching condition, and provides the target account to the user through an invitation interface, and the user directly invites the corresponding target account to join the player team by operating the invitation interface. This automatic user matching solution can reduce the need for the user to manually browse the friend list and select and invite users, and improve the intelligence and usability of the virtual game system.

In the following, the virtual game being a virtual game (also referred to as a target virtual game in this specification), the first account joining a player team (also referred to as a target team in this specification), and the invitation interface being team invitation information are used as examples, to describe the technical solutions of the embodiments.

In an implementation, as shown in FIG. 2B, the user matching method includes:

- S202. Display a first account in a target team of a target virtual game (that is, a virtual game).
- S204. Obtain account information of at least one second account in the virtual game, the account information including at least one of the following: a login state, a game progress state, and a target information matching degree with the first account (that is, a matching degree with the first account from the perspective of information).
- S206. Determine a target account from the at least one second account according to the account information.
- S208. Display team invitation information matching the target account, the team invitation information being used for prompting the first account to invite the target account to join the target team (that is, the player team joined by the first account) to participate in the virtual game together.

In this embodiment, the user matching method may be, but is not limited to, applied to a game application in which a virtual game is installed. The game application may include, but is not limited to, all games using a thermal weapon for a remote attack, including, but not limited to, a first-person shooting game, a third-person shooting game, and the like. The shooting application may be a multiplayer online battle arena (MOBA for short) game or a single-player game (SPG for short). The types of the game applications may include, but are not limited to, at least one of the following: a two dimension (2D for short) game application, a three dimension (3D for short) game application, a virtual reality (VR for short) game application, an augmented reality (AR for short) game application, and a mixed reality (MR for short) game application. The above is only an example, and is not limited in this embodiment.

In some embodiments, in this embodiment, the game application may be, but is not limited to, a shooting application logged in through the first account and running in a game client, and a virtual operation object is controlled by the first account. In other words, the player logs in to the shooting application running in the game client through the account and controls the virtual operation object. The game screen of the shooting game and other non-game interfaces (such as, a team forming interface, and a preparation interface) are displayed on a display screen of a mobile terminal where the client running the shooting application is located.

In this embodiment, the account information of the at least one second account in the virtual game is obtained when the first account is in any seat of the player team. It can be understood but not limited to that the account information of the at least one second account is obtained when the first account is in a team forming state. The timing of obtaining the account information of the at least one second account may include but is not limited to the time when the first account is in the team forming state or the preset time after the first account is in the team forming state or when an account team forming request actively triggered by the first account is obtained after the first account is in the team forming state.

In this embodiment, the first account and the second account may have, but is not limited to, an association relationship. The association relationship may be, but is not limited to, understood as the relationship between the accounts due to some virtual element, for example, a friend association relationship (being friends in virtual games or other scenes), a regional association relationship (in the same region), or a team association relationship (in the same team or group).

In this embodiment, the account information includes at least one of the following: a login state, a game progress state, and a matching degree with the first account. The login state may be but is not limited to a state of the account logged in the virtual game, the game progress state may be but is not limited to a running state of the account in the virtual game (such as online, offline, or in-game), and the matching degree with the first account may be but is not limited to a matching degree between the account and the first account in the dimension of target information (such as the friend relationship, whether there is cooperation between configured resources, or whether there is association between historical operation data of the account).

In this embodiment, the target account is an account whose account information meets the team invitation condition (that is, the preset matching condition) in the at least one second account. For example, if account information of second account A and second account C does not meet the team invitation condition, and account information of second account B meets the team invitation condition, the second account B is determined as the target account.

In this embodiment, the team invitation condition may be but is not limited to the preset matching condition under the account information dimension. If a matching condition of an account information is preset as “5-8”, when it is obtained that the account information of second account A is “3”, because “3” does not match “5-8”, it is further determined that the second account A does not meet the team invitation condition. On the contrary, when it is obtained that the account information of second account B is “6”, because “6” matches “5-8”, it is further determined that the second account B meets the team invitation condition.

In addition, in this embodiment, the account information includes at least one of the following: a login state, a game progress state, and a matching degree with the first account. That is, the account information may be but is not limited to single-dimensional information or multi-dimensional information, and then when the account information is multi-dimensional information, the corresponding team invitation condition may also be but is not limited to a multi-dimensional team invitation condition. For example, assuming that the account information includes the login state and the game progress state, the team invitation condition may be but is not limited to two types of invitation conditions preset for the login state and the game progress state respectively, or may be a type of comprehensive invitation condition preset for information obtained after the login state and the game progress state are integrated.

In this embodiment, in the process of displaying the team invitation information matching the target account, a triggerable virtual button may be set on the interface where the team invitation information is located, and when the virtual button is triggered, a team invitation instruction may be but is not limited to further obtained. The team invitation instruction may be, but not limited to being, used to instruct the client where the target account is located to transmit an invitation request for joining the player team to participate in the virtual game together.

In this embodiment, when the team invitation information includes a plurality of types or a plurality of pieces of invitation information, the plurality of types or plurality of pieces of invitation information are sorted and displayed according to the account information. Alternatively, when there are a plurality of target accounts, the team invitation information matching the target accounts is sorted and displayed according to sorting information carried in the account information. The sorting information may be but is not limited to indicating different sorting rules in the account information of different dimensions, for example, under the dimension of the login state, the sorting rules may include but are not limited to preferentially displaying the login state ranked in front, and the like. In another example, in the dimension of the game progress state, the sorting rules may include but are not limited to sorting and displaying in a manner of the priority of an idle state greater than that of a non-idle (also referred to as occupied) state greater than that of an offline state. In another example, under the dimension of the matching degree with the first account, the sorting rules may include but are not limited to that a larger matching degree indicates a higher display priority.

In some embodiments, in this embodiment, the determining a target account from at least one second account according to the account information may be, but is not limited to, determining a second account in which a matching degree between account information of the second account and the account information of the target account reaches a user matching condition from the at least one second account as the target account, or may be, but is not limited to, determining a second account in which a matching degree between account information of the second account and overall account information of all accounts in the player team reaches a user matching condition from the at least one second account as the target account. Alternatively, the basis for determining the target account may be, but is not limited to, including the matching with other accounts in the player team in addition to the matching with the first account.

Further, for example, there are account a, account b, and account c in the player team (assumed to be a 5-person team) where the first account is currently located, the game position that the first account is good at is “mage”, the game position that account a is good at is “jungle”, the game position that account b is good at is “support”, and the game position that account c is good at is “shooter”, and the best position arrangement of the known team is mage, support, jungle, shooter, and topsolo. In this way, the most lacking game position of the current player team is “topsolo”, or the game position that best matches the current player team is “topsolo”. Therefore, it is necessary to determine the target account that is good at the “topsolo” game position from the at least one second account. Further, the user matching rationality of the player team is improved by taking the account information of all accounts in the player team as the basis of obtaining the target account, and then the player can start the virtual game faster after obtaining a rational lineup of the player team, thereby achieving the effect of improving the operation efficiency of the virtual game.

The method of whether the account information meets the team invitation condition is used to determine which associated account is the to-be-invited account, thereby helping players to complete more comprehensive team forming by accounts efficiently and accurately. In addition, because the account information is limited to at least one of the three dimensions of the login state, the game progress state, and the matching degree with the first account, it fully fits the particularity of the virtual game scene, recommends the best teammates for users in the current team forming scene, and improves the user experience.

Figure 3:
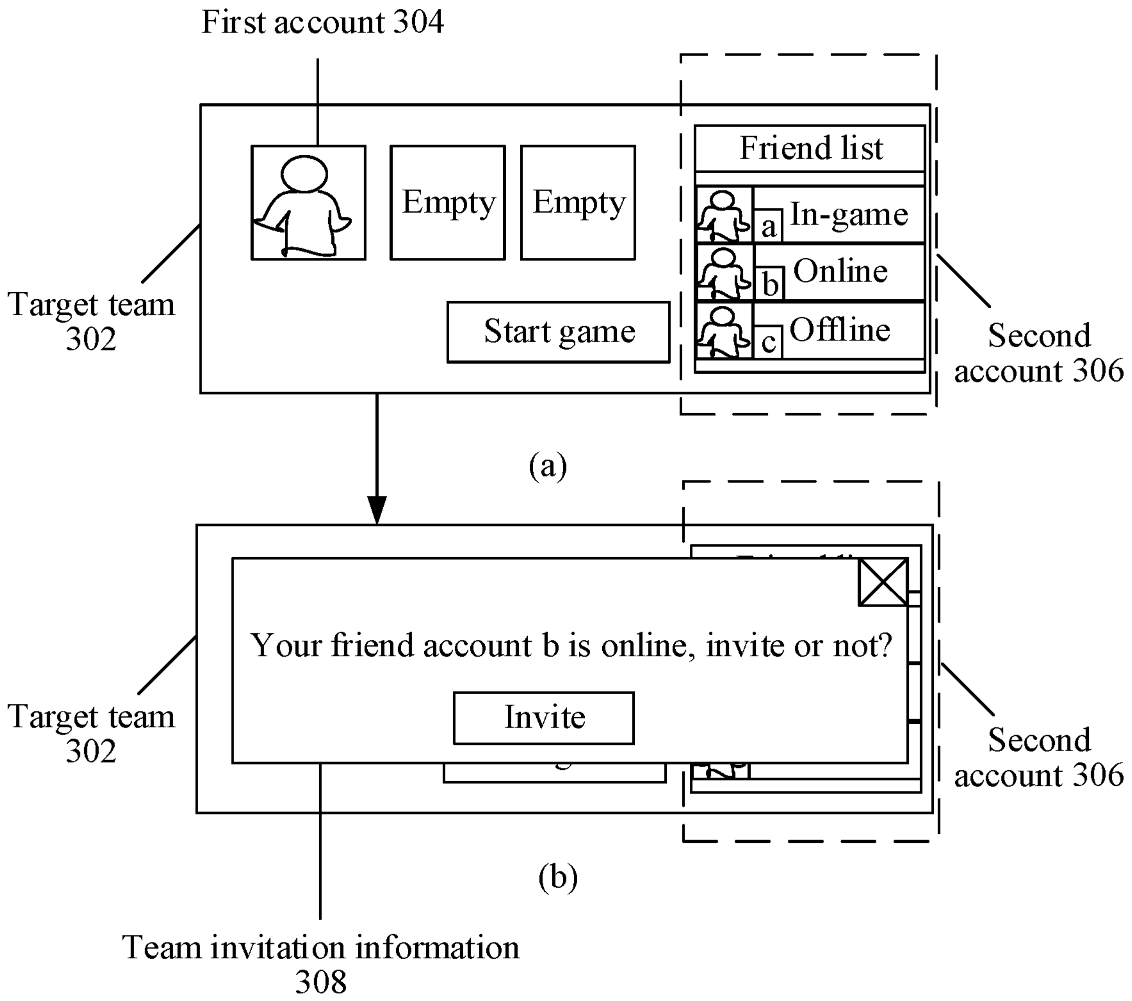
FIG. 3 is a schematic diagram of a user matching method according to an embodiment of this application.

Further, for example, as shown in FIG. 3, a team forming interface of a player team 302 is displayed, where the team forming interface includes a first account 304 already located at one seat in the player team 302 and two vacant seats in the player team 302. It is assumed that, as shown in (a) of FIG. 3, account information of at least one second account 306 (an account in a friend list, such as account a, account b, or account c) having an associated relationship with the first account 304 is obtained, where the account information includes at least one of the following: a login state, a game progress state, and a matching degree with the first account. Then, according to the account information, a target account (such as account b) is determined from the at least one second account 306 (for example, account b is in an online state and meets a team invitation condition). Further, as shown in (b) of FIG. 3, team invitation information 308 matching the target account is displayed, where the team invitation information 308 is used for prompting the first account 306 to invite account b to join the player team 302 where the first account 306 is located, to participate in the virtual game together.

According to the embodiments provided by this application, a first account in a player team of a virtual game is displayed; account information of at least one second account in the virtual game is obtained, the account information including at least one of the following: a login state, a game progress state, and a matching degree with the first account; a target account is determined from the at least one second account according to the account information, account information of the target account meeting a team invitation condition; and team invitation information matching the target account is displayed, the team invitation information being used for prompting the first account to invite the target account to join the player team to participate in the virtual game together. The method of whether the account information meets the team invitation condition is used to determine which associated account is the to-be-invited account, to help players to complete the user matching in time and accurately, thereby achieving the technical effect of optimizing the timeliness of the user matching.

As a solution, when the account information includes the login state, the determining a target account from at least one second account according to the account information includes:

determining the target account in which the login state is in an offline state when the first account is not in the player team and the login state is in an online state when the first account is in the player team from the at least one second account.

Under the dimension that the account information includes the login state, determining whether the account information meets the team invitation condition may be understood as determining whether the offline time in the login state is before the time when the first account joins the player team and whether the online time is after the time when the first account joins the player team; Its technical logic may be, but is not limited to, that after the first account joins the player team, all online second accounts that may be invited to form a team are browsed elliptically or fully, but offline second accounts that cannot be invited to form a team are often ignored, or may be understood as accounts in the blind area of the first account; However, after all the online second accounts that can be invited to form a team are browsed, one or more newly logged-in second accounts may appear. In this case, the newly logged-in second accounts become the accounts in the blind area of the first account. In order to avoid the decrease of the comprehensiveness of team forming by accounts due to the blind area, in this embodiment, second accounts in the blind area (offline) but leaving the blind area after the first account joins the player team (such as just online) are determined as target accounts for priority recommendation and invitation, so that the second accounts in the blind area of the first account are included in the list of accounts for priority recommendation and invitation for team forming, thereby avoiding the problem that the second accounts cannot be invited to form a team in time because the second accounts are located in the blind area of the first account.

Figure 4:
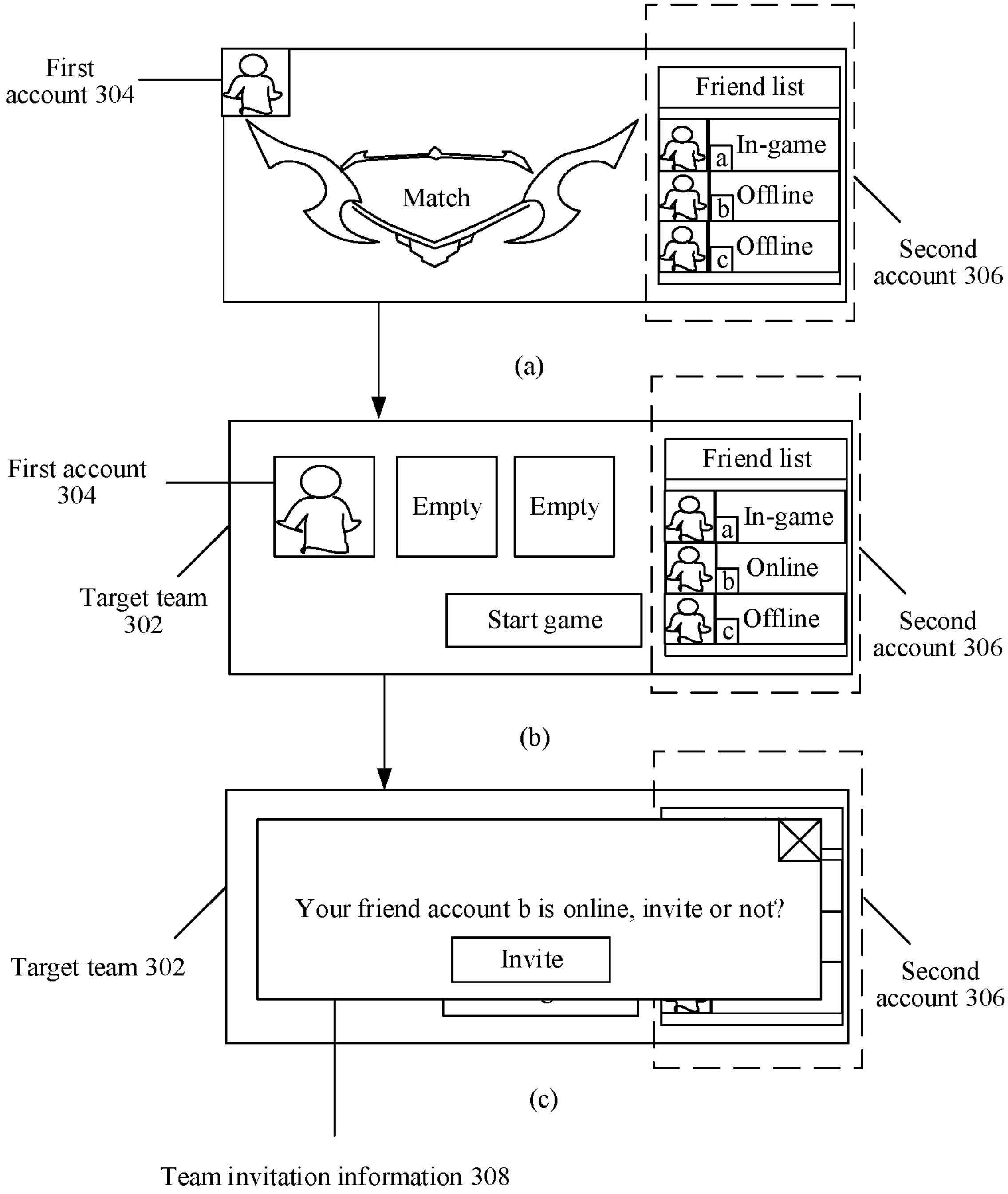
FIG. 4 is a schematic diagram of another user matching method according to an embodiment of this application.

Further, for example, based on the scene shown in FIG. 3, a main interface of the virtual game is displayed, as shown in FIG. 4. A first account 304 logged in to the virtual game and a friend list associated with the first account 304 are further displayed on the main interface, and a plurality of second accounts 306, such as account a, account b, and account c, are displayed in the friend list. As shown in (a) of FIG. 4, the progress states of the current account a, account b, and account c are in-game, offline, and offline respectively; Further, as shown in (b) of FIG. 4, the first account 304 already in the player team 302 is displayed, and it is assumed that the progress state of account b is adjusted to online after the first account 304 joins the player team 302, which indicates that account b logs in to the virtual game after the first account 304 joins the player team 302. Based on this, account b is determined as the target account, and further as shown in (c) of FIG. 4, team invitation information 308 is displayed.

According to the embodiments provided by this application, the target account in which the login state is in an offline state when the first account is not in the player team and the login state is in an online state when the first account is in the player team is determined from the at least one second account, so that the second accounts in the blind area of the first account are included in the list of accounts for priority recommendation and invitation for team forming, thereby achieving the effect of improving the timeliness of team forming by accounts.

As a solution, after the displaying team invitation information matching the target account, the method further includes:

hiding the team invitation information when operation information for the team invitation information is not obtained within a target time period. The hiding may mean stopping displaying.

In this embodiment, as shown in (b) of FIG. 3, the team invitation information 308 further displays at least one virtual button, such as a virtual button "Invite" or a virtual button "x", where the virtual button "Invite" may be, but is not limited to, set as triggering of a team invitation instruction (inviting account b to join the player team 302), and the virtual button "x" may be, but is not limited to, set as triggering of an information closing instruction (closing the team invitation information 308). If any operation information is not obtained on the at least one virtual button within the target time period, the team invitation information 308 is hidden/closed, where the hiding the team invitation information 308 may be, but is not limited to, understood as hiding but displaying an identifier corresponding to the team invitation information 308 in a smaller display range.

Because the consideration of the dimension of the login state is to avoid the situation that the second account in the blind area of the first account cannot be invited in time, but in fact, it cannot guarantee that the second account in the blind area of the first account is definitely the object that the first account wants to request, and then when the operation information for the team invitation information is not obtained within the target time period, it indicates that the first account does not want to invite the second account, thereby hiding the team invitation information and reducing the impact of the team invitation information on the first account.

As a solution, when the account information includes the game progress state, the determining a target account from at least one second account according to the account information includes:

S1. determining at least one candidate account in which the game progress state is an occupied state from the at least one second account;

S2. obtaining an idle remaining time (also referred to as a remaining occupation time) corresponding to each of the at least one candidate account; and S3. determining the target account in which the remaining occupation time is less than or equal to a first threshold from the at least one candidate account.

In this embodiment, the remaining occupation time is a cumulative time from the end time of the occupied state to the current time. When the remaining occupation time is null, the corresponding candidate account is set to an idle state.

In this embodiment, the game progress state may be, but is not limited to, used for indicating the state of the account in the virtual game, such as an online state (logged in to the virtual game) and an offline state (not logged in to the virtual game), and the online state may be subdivided into an occupied state (already participating in the progress of a virtual game) and an idle state (not participating in the progress of any virtual game).

The online second account is often a to-be-invited object of the user (the first account), but one condition for inviting to form a team often includes that the to-be-invited object needs to be in an idle state, which easily leads to the occupied second account being put into the blind area of the first account; There may be a case where one or more second accounts are currently in the occupied state, but the occupied state is about to end, which leads to the second account being put into the blind area of the first account in this case, but not invited in time, reducing the comprehensiveness of team forming by accounts. In order to avoid the decrease of the comprehensiveness of team forming by accounts due to the blind area, in this embodiment, second accounts in the blind area (occupied) and having low remaining time of the occupied state are determined as target accounts for priority recommendation and invitation, so that the second accounts in the blind area of the first account are included in the list of accounts for priority recommendation and invitation for team forming, thereby avoiding the problem that the second accounts cannot be invited to form a team in time because the second accounts are located in the blind area of the first account.

Figure 5:
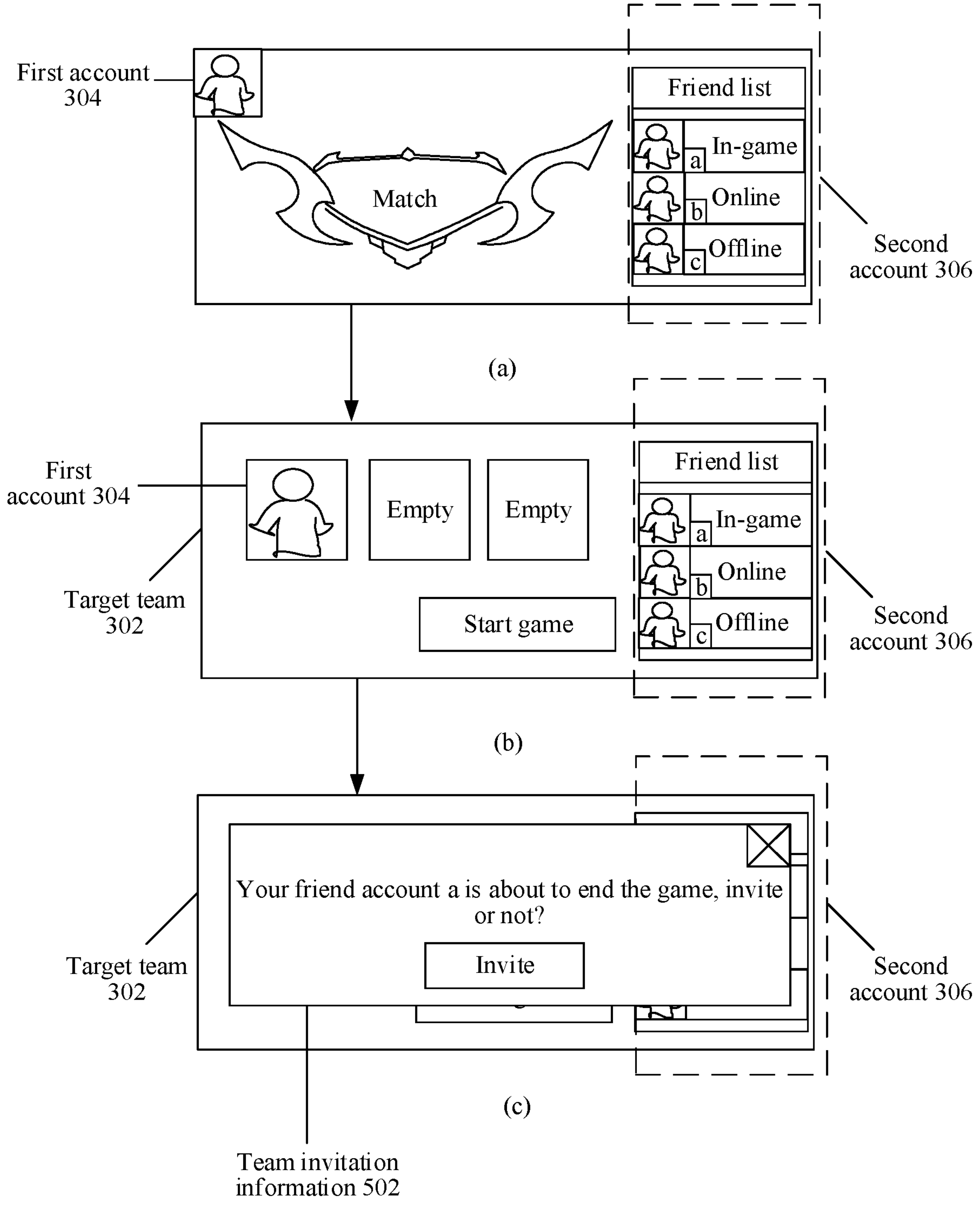
FIG. 5 is a schematic diagram of another user matching method according to an embodiment of this application.

For example, based on the scene shown in FIG. 3, a main interface of the virtual game is displayed, as shown in FIG. 5. A first account 304 logged in to the virtual game and a friend list associated with the first account 304 are further displayed on the main interface, and a plurality of second accounts 306, such as account a, account b, and account c, are displayed in the friend list; As shown in (a) of FIG. 5, the progress states of the current account a, account b, and account c are in-game, online, and offline respectively; Further, as shown in (b) of FIG. 5, the first account 304 already in the player team 302 is displayed, and it is assumed that the game progress of the account a is about to end after the first account 304 joins the player team 302. Based on this, account a is determined as the target account, and further as shown in (c) of FIG. 5, team invitation information 502 "Your friend account a is about to end the game, invite or not?" is displayed.

According to the embodiment provided by this application, at least one candidate account in which the game progress state is an occupied state is determined from the at least one second account; a remaining occupation time corresponding to each of at least one candidate account is obtained; and the target account in which the remaining occupation time is less than or equal to a first threshold is determined from the at least one candidate account, so that the second accounts in the blind area of the first account are included in the list of accounts for priority recommendation and invitation for team forming, thereby achieving the effect of improving the of team forming by accounts.

As a solution, the displaying team invitation information includes:

when the team invitation information includes at least two pieces of invitation information, sorting and displaying the at least two pieces of invitation information according to the remaining occupation time corresponding to the target account matched by each of the at least two pieces of invitation information.

In this embodiment, the remaining occupation time may be, but is not limited to, displayed in a clear and intuitive way, such as progress bar and countdown, to prompt the target account to end time information of the current virtual game.

When the team invitation information includes at least two pieces of invitation information, the at least two pieces of invitation information are sorted and displayed according to the remaining occupation time corresponding to the target account matched by each of the at least two pieces of invitation information.

Figure 6:
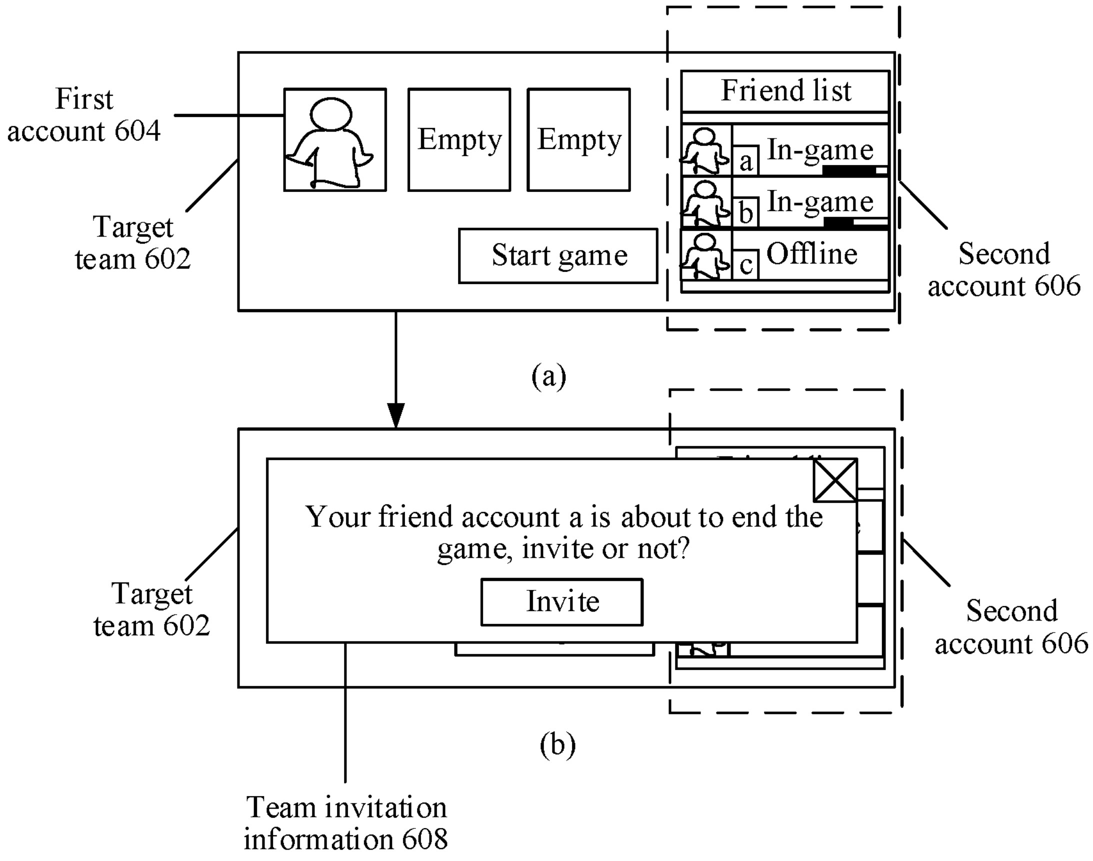
FIG. 6 is a schematic diagram of another user matching method according to an embodiment of this application.

Further, for example, as shown in FIG. 6, a first account 604 in the player team 602 and a friend list associated with the first account 604 are displayed on the interface of the player team 602, and a plurality of second accounts 606, such as account a, account b, and account c, are further displayed in the friend list. Moreover, as shown in (a) of FIG. 6, both account a and account b are in the in-game state (occupied state), and the remaining time is displayed in the form of progress bar (black is used for indicating the completed game progress, and white is used for indicating the uncompleted game progress). Further, assuming that the remaining occupation times (white progress parts) of account a and account b both meet the team invitation condition, because the remaining occupation time of account a is less than the remaining occupation time of account b, team invitation information 608 matched by account a is preferentially displayed, as shown in (b) of FIG. 6. In some embodiments, after the team invitation information 608 matched by account is hidden or closed, team invitation information matched by the next account b meeting the team invitation condition is sequentially displayed. Alternatively, in some embodiments, the team invitation information 608 matched by account a and the team invitation information matched by account b are simultaneously displayed, but an information display range of the team invitation information 608 matched by account a is greater than an information display range of the team invitation information matched by account b.

According to the embodiment provided by this application, when the team invitation information includes at least two pieces of invitation information, the at least two pieces of invitation information are sorted and displayed according to the remaining occupation time corresponding to the target account matched by each of the at least two pieces of invitation information, thereby achieving the purpose of preferentially displaying more valuable invitation information and achieving the effect of improving the display efficiency of the invitation information.

As a solution, when the account information includes the matching degree with the first account, the determining a target account from at least one second account according to the account information includes:

determining the target account in which a resource information matching degree with the first account is greater than or equal to a second threshold from the at least one second account, where the resource information matching degree is used for indicating a matching degree between virtual resources matched by a plurality of accounts, and the matching degree includes the resource information matching degree.

In this embodiment, the virtual resource may be, but is not limited to, a resource that may be applied in the progress of the virtual game, such as a virtual operation character controlled by an account, or a virtual subordinate object belonging to the virtual operation character, or a virtual prop, a virtual attribute, a virtual skill, or the like that may be used or configured in the virtual game.

In this embodiment, the virtual resource matched by the account may be, but is not limited to, understood as a virtual resource actively or passively matched by the account in various situations, such as a virtual resource that is matched by the account and may be set in a fixed interface, or a matched virtual resource allocated the system for the account according to historical operation information of the account.

In this embodiment, the matching relationship between virtual resources may be, but is not limited to, configured by the account or configured by the system according to the feedback of big data. For example, if the matching degree between virtual resource A and virtual resource B is 50%, then when the first account matches virtual resource A and the second account matches virtual resource B, the virtual resource matching degree between the first account and the second account may be, but is not limited to, 50%.

In this embodiment, an optimal team object is automatically selected for the account, and the consideration is how to accurately know a cooperation degree between accounts, and select the optimal team object for the account based on the cooperation degree. The cooperation degree may include two aspects, one is the operation habit of the account, that is, the user, and the other is the matching degree between virtual resources provided by the virtual game. The operation habit tends to be subjective and it is difficult to make high-precision determination. However, the matching degree between virtual resources exists objectively, and therefore may be used as a high-precision determination basis to know the cooperation degree between the accounts. It can be seen that compared with users determining whether operation habits of other users match with themselves, the way of matching virtual resources is more stable and more in line with the technical logic of improving the comprehensiveness of team forming by accounts.

As a solution, the obtaining account information of at least one second account in the virtual game includes:

S1. obtaining a first virtual resource currently configured by the first account, and obtaining a second virtual resource currently configured by each of the at least one second account; and S2. respectively calculating a matching degree between each second virtual resource and the first virtual resource to obtain a plurality of resource information matching degrees; or S1. obtaining a first target virtual resource according to historical operation information of the first account, and obtaining a second target virtual resource according to historical operation information of the second account; and S2. respectively calculating a matching degree between each second target virtual resource and the first target virtual resource to obtain a plurality of resource information matching degrees; or S1. obtaining a first target virtual resource according to historical operation information of the first account, and obtaining a second virtual resource currently configured by each of the at least one second account; and S2. respectively calculating a matching degree between each second virtual resource and the first target virtual resource to obtain a plurality of resource information matching degrees; or S1. obtaining a first virtual resource currently configured by the first account, and obtaining a second target virtual resource according to historical operation information of the second account; and S2. respectively calculating a matching degree between each second target virtual resource and the first virtual resource to obtain a plurality of resource information matching degrees.

In this embodiment, the method for obtaining virtual resources may include, but is not limited to, obtaining virtual resources currently configured by accounts and obtaining target virtual resources customarily configured by the accounts according to historical operation information of the accounts. In the calculation process of the matching degree between the first account and the second account, the virtual resources and the target virtual resources may be used for multi-type calculation to obtain more diverse calculation results, that is, more diverse resource information matching degree of.

As a solution, when the account information includes the matching degree with the first account, the determining a target account from at least one second account according to the account information includes:

determining the target account in which an interaction information matching degree with the first account is greater than or equal to a third threshold from the at least one second account, where the interaction information matching degree is used for indicating a matching degree between interaction relationships matched by a plurality of accounts, and the matching degree includes the interaction information matching degree.

In this embodiment, the interaction relationship may, but not limited to, represent the relationship fed back in the interaction process. For example, frequent interaction modes (chatting or giving gifts,) may be used between two accounts to increase the interaction information matching degree between the two accounts.

The interaction relationship may often reflect the information of whether the accounts interact frequently, and if the accounts interact frequently, it can be understood but not limited to that the account is the object that another account wants to invite to form a team preferentially. Alternatively, the interaction relationship ship can be understood as the relationship between teams are frequently formed to participate in virtual games, so that automatically prompting to invite accounts that frequently form teams to participate in virtual games can naturally improve the comprehensiveness of team forming by accounts.

According to the embodiment provided by this application, the target account in which an interaction information matching degree with the first account is greater than or equal to a third threshold is determined from the at least one second account, where the interaction information matching degree is used for indicating a matching degree between interaction relationships matched by a plurality of accounts, and the matching degree includes the interaction information matching degree, thereby achieving the effect of improving the comprehensiveness of team forming by accounts.

As a solution, when the account information includes at least two of the following: the login state, the game progress state, and the matching degree, the displaying team invitation information includes:

when the team invitation information includes at least two pieces of invitation information, sorting and displaying the at least two pieces of invitation information according to an interaction information matching degree matched by each of the at least two pieces of invitation information.

When the account information includes multiple dimensions of information, it is necessary to specify the display priority of the invitation information, to avoid the problem that display conflicts occur to affect prompting the user to invite accounts to form a team.

Figure 7:
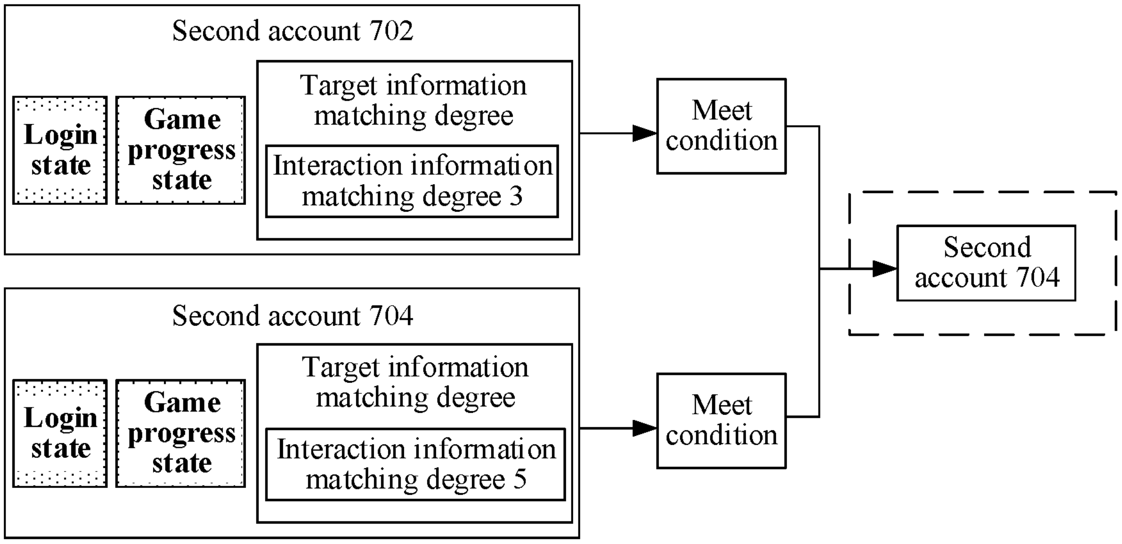
FIG. 7 is a schematic diagram of another user matching method according to an embodiment of this application.

Further, for example, as shown in FIG. 7, assuming that the account information (assuming that it includes three dimensions of information: the login state, the game progress state, and the matching degree) of the second account 702 and the second account 704 has been obtained where the account information of the second account 702 and the second account 704 meets the team invitation condition in the dimensions of the login state and the game progress state, interaction information matching degrees of the second account 702 and the second account 704 are used as the sorting basis to preferentially display the invitation information matched by the second account 704 with the larger interaction information matching degree ("5" is greater than "3").

According to the embodiment provided by this application, when the team invitation information includes at least two pieces of invitation information, the at least two pieces of invitation information are sorted and displayed according to an interaction information matching degree matched by each of the at least two pieces of invitation information, thereby achieving the effect of improving the display efficiency of the invitation information.

As a solution, the displaying team invitation information includes:

when the team invitation information includes at least two pieces of invitation information and the account information includes the matching degree, sorting and displaying the at least two pieces of invitation information according to the matching degree matched by each of the at least two pieces of invitation information.

Because there is clearly high or low matching degree, when the team invitation information includes at least two pieces of invitation information and the account information includes the matching degree, the at least two pieces of invitation information are sorted and displayed according to the matching degree matched by each of the at least two pieces of invitation information.

Figure 8:
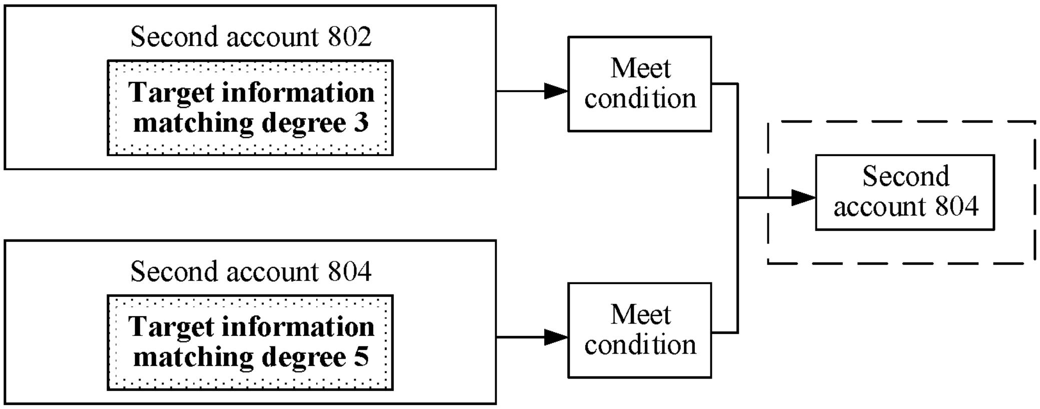
FIG. 8 is a schematic diagram of another user matching method according to an embodiment of this application.

Further, for example, as shown in FIG. 8, assuming that the matching degrees of the second account 802 and the second account 804 have been obtained, where the matching degrees of the second account 802 and the second account 804 both meet the team invitation condition, the matching degrees of the second account 802 and the second account 804 are used as the sorting basis to preferentially display the matching degree of the invitation information matched by the second account 804 with the larger matching degree ("5" is greater than "3").

According to the embodiment provided by this application, when the team invitation information includes at least two pieces of invitation information and the account information includes the matching degree, the at least two pieces of invitation information are sorted and displayed according to a matching degree matched by each of the at least two pieces of invitation information, thereby achieving the effect of improving the display efficiency of the invitation information.

As a solution, the displaying team invitation information matching the target account includes:

displaying the team invitation information when there is at least one vacant seat in the player team.

In some embodiments, in this embodiment, the team invitation information is hidden when there is no vacant seat in the player team; and the team invitation information is displayed when there is at least one vacant seat in the player team.

Further, for example, as shown in FIG. 3, the team invitation information 308 is displayed when there is at least one vacant seat currently in the player team 302. Alternatively, assuming that there is no vacant seat currently in the player team 302, even if the target account is obtained, the invitation information matched by the target account is not displayed.

According to the embodiment provided by this application, when there is at least one vacant seat in the player team, the team invitation information is displayed, so that the purpose of reducing the occurrence probability of irrational factors in team forming caused by the display of the team invitation information is achieved, thereby achieving the effect of improving the solution integrity of team forming by accounts.

As a solution, when the account information includes the matching degree with the first account, the method includes the following steps:

S1. obtaining second attribute information of a virtual character controlled by at least one second account in the virtual game; and S2. determining a target account from the at least one second account according to first attribute information, where a matching degree between the second attribute information of the virtual character controlled by the target account in the virtual game and the first attribute information of the virtual character controlled by the first account in the virtual game reaches a fourth threshold, and the matching degree includes a matching degree between the first attribute information and the second attribute information.

In some embodiments, in this embodiment, the virtual game may be, but is not limited to, a virtual game in which one or more virtual characters that need to be controlled by an account user. Based on this, in the process of participating in the virtual game together, the attribute information possessed by a plurality of virtual characters may be, but is not limited to, a combined or cooperated mode, to improve the completion efficiency of the virtual game and improve the cooperation enthusiasm among account users.

In some embodiments, in this embodiment, the attribute information of the virtual character may be, but is not limited to, understood as attribute information that is possessed by the virtual character and that can affect the process of the virtual game, such as skill attribute information, card attribute information, grade attribute information, battle attribute information, class attribute information and the like of the virtual character.

Further, for example, the attribute information being the battle attribute information is used as an example for description. Assuming that the battle attribute information (first attribute information) of the virtual character controlled by the first account in the virtual game is strong in offensive attribute and weak in defensive attribute, it is necessary to match the battle attribute information (second attribute information) with strong defensive attribute for the first account to supplement each other and form cooperation.

Further, for example, the attribute information being the class attribute information is used as an example for description. Assuming that the class attribute information (the first attribute information) of the virtual character controlled by the first account in the virtual game is a mage, it is necessary to match the second account corresponding to the virtual operation object of a non-mage class (the second attribute information) for the first account.

Through the embodiment provided by this application, second attribute information of a virtual character controlled by at least one second account in the virtual game is obtained; and a target account is determined from the at least one second account according to first attribute information, where a matching degree between the second attribute information of the virtual character controlled by the target account in the virtual game and the first attribute information of the virtual character controlled by the first account in the virtual game reaches a fourth threshold, and the matching degree includes a matching degree between the first attribute information and the second attribute information, thereby achieving the effect of improving the matching degree when controlling the virtual character to participate in the virtual game.

As a solution, for ease of understanding, an example in which the foregoing user matching method is applied to the shooting game scene for description.

With the socialization of games, especially in large-scale shooting games, more players tend to play games with their friends, but due to various reasons, such as time problems or in-game problems, players who want to play together cannot be better combined. Therefore, this solution provides some intelligent invitation solutions to resolve the problem that players can not invite teammates in time;

This embodiment mainly resolves some problems of team invitation through three directions, for example, the function of automatically prompting and inviting when friends log in, the function of automatically prompting and prompting when friends are at the end of games, and the function of inviting and prompting best matches to form a team. Because are many skills in the game, and the combination of some skills can have stronger effects, if a combination skill is commonly used between two friend players, the system automatically prompts the two friends to actively invite to be together, so that they can have stronger effects.

In some embodiments, in this embodiment, in most cases, a player creates a room when wanting to form a team for games, and then checks which friends are still online in the friend list and then invite them. However, the player cannot check the friend list all the time to see which friends are online and then invite them, and therefore the player may miss some situations that a new friend has not logged in when the player is creating a room, but logs in after a period of time. Therefore, if the friend of the player logs in after the player has created a private game room, prompt information matching thresholds may pop up, to prompt and invite the friend to enter the private game room. In this way, the player can immediately know that a friend is online, and then can invite the friend immediately, and the invited friend can also form a team to participate in games immediately.

Further, for example, when friend A of the player logs in, the server can know and tell the player. In this case, a local dialog box pops up to prompt the player whether to invite player A.

In some embodiments, in this embodiment, it may be, but not limited to, adding prompting to invite at the end of the game of the friend, that is, when there are still more than ten seconds left in the game of the friend, a pop-up window informs the player whether to invite the friend. After the pop-up window is clicked to confirm, because the friend may have not exited the current game, the invitation is not pushed to the player immediately until the friend player exits to the matching interface, and then the friend can click to confirm.

Further, for example, when friend A of the player is about to end in the game, if the server obtains that the player is in a self-created room and lacks team members, the server informs the player that his friend A is about to end the game, and the system automatically pops up a window to prompt the player.

In some embodiments, in this embodiment, players can also use all kinds of chip skill weapons, and because each skill weapon has its own uniqueness, each player chooses best skill weapon chips that the player is good at, but some chip skill combinations may have a more effective or more powerful force. For example, combination use of two chip skills such as an airborne chip and a space-time chip are used, where the specific effect of the airborne chip is to bounce players to high altitude, and then make the players fly to other places through wings, which can assault the enemy, but may fall into dangerous places. Therefore, with the time-space chip, the players return to the position 5 seconds ago, and at this time, the players may be in the early stage of bounce, and can fly back to teammates through wings. The combination use of the two chips can make players back to their camp quickly after the quick assault.

Therefore, each player wants a friend whose skill matches the skill the player uses, so that when a friend has always been using a skill and the player is equipped with a skill that can be combined with it, the system makes an intelligent prompt.

In some embodiments, in this embodiment, a relationship table of matching combinations between skills is created in advance, as shown in Table (1) below:

TABLE 1

| | Skills | | |
|---|---|---|---|
| Skills | Skill A | Skill B | Skill C |
| Skill A | No | Yes | No |
| Skill B | Yes | No | No |
| Skill C | No | No | No |

When the player updates the equipment, the equipment relationship between the current friends is obtained. If the matching combination is obtained, it is sent to the player for invitation.

Further, for example, the foregoing user matching method is applied in the shooting game scene shown in FIG. 9, and the specific steps are as follows:

Step S902. A player is in a team forming room.

Step S904. Determine whether a friend logs in, if yes, perform step S906, and if no, perform step S902.

Step S906. Prompt a dialog box that the friend logs in and whether to invite.

Step S908. Whether an operation triggered on the dialog box is obtained, if yes, perform step S910, and if no, perform step S906.

Step S910. Display that the friend enters the team forming room.

The foregoing steps are the determining of whether to log in, while in other dimensions, it can also, but not limited to, include the determining of whether to end the game soon, whether the skill matching the player is equipped, and the like, as in the following steps, but these three types of steps may be, but are not limited to, parallel execution, and are to not be understood as serial execution. The specific content is as follows:

Step S912. Determine whether the friend is about to end the game, if yes, perform step S914, and if no, perform step S902.

Step S914. Prompt that the friend is about to end the game soon, and prompt a dialog box of whether to invite.

Step S916. Whether an operation triggered on the dialog box is obtained, if yes, perform step S918, and if no, perform step S914.

Step S918. Display that the friend enters the team forming room.

Step S920. Determine whether the friend is equipped with the skill matching the player, if yes, perform step S922, and if no, perform step S902.

Step S922. Prompt that the friend is equipped with the skill matching the player, and prompt a dialog box of whether to invite.

Step S924. Whether an operation triggered on the dialog box is obtained, if yes, perform step S926, and if no, perform step S922.

Step S926. Display that the friend enters the team forming room.

Figure 10:
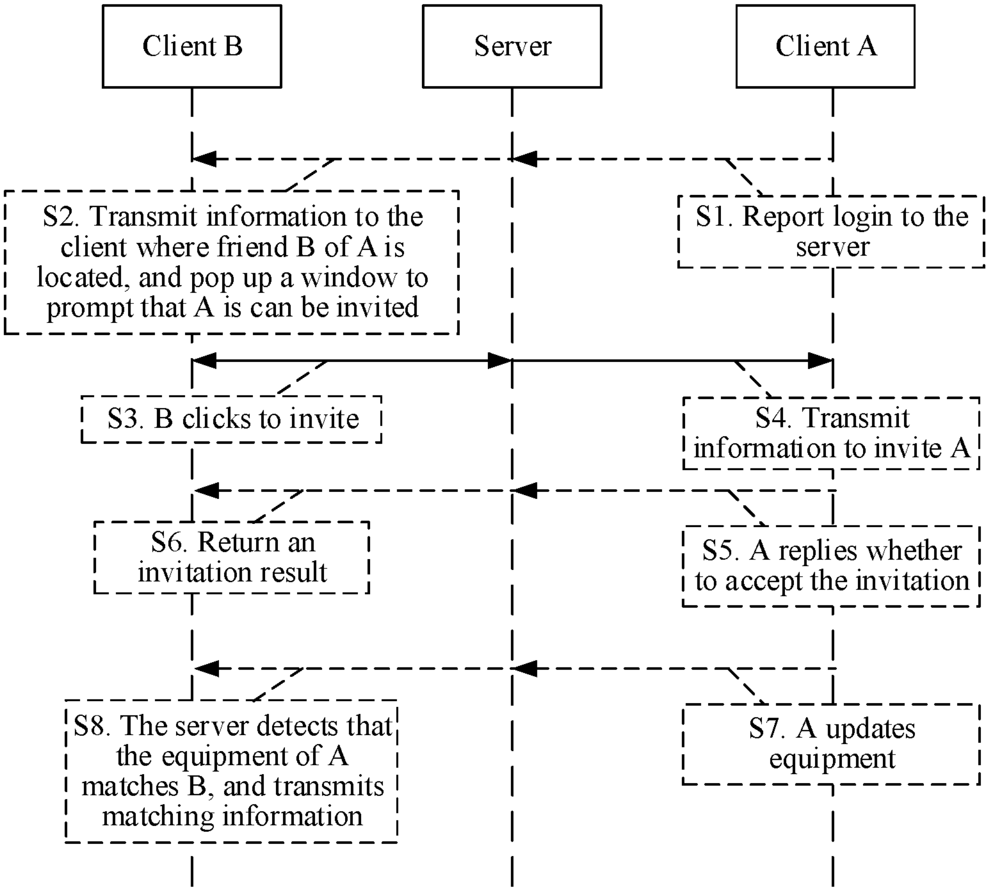
FIG. 10 is a schematic diagram of another user matching method according to an embodiment of this application.

Further, for example, the clients (client A and client B) communicate with the server, as shown in FIG. 10:

Step S1. Report login information of client A to the server.

Step S2. Transmit the login information to the client where friend B of A is located, and pop up a window to prompt that A can be invited.

Step S3. Obtain an instruction that B invites A on client B.

Step S4. Transmit information to client A.

Step S5. Client A replies information of whether A accepts the invitation from B.

Step S6. Return an invitation result to client B.

Step S7. Client A reports information that A has updated equipment.

Step S8. The server obtains that equipment of A matches B, and transmits matching information for B to determine whether to invite A.

It can be understood that in the specific implementations of this application, data related to user information is involved. When the foregoing embodiments of this application are applied to specific products or technologies, user permission or consent is required, and the collection, use and processing of relevant data need to comply with relevant laws, regulations and standards of relevant countries and regions.

To simplify the description, the foregoing method embodiments are described as a series of action combination. But a person of ordinary skill in the art needs to know that the present application is not limited to any described sequence of the action, as some steps can adopt other sequences or can be executed simultaneously according to the present application. In addition, a person skilled in the art also needs to know that all the embodiments described in the specification are preferred embodiments, and the related actions and modules are not necessarily mandatory to this application.

Figure 11:
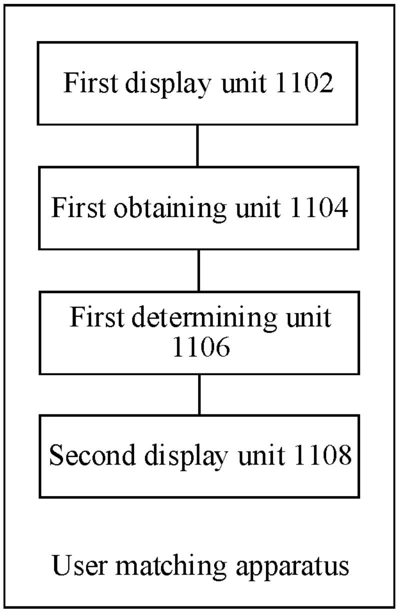
FIG. 11 is a schematic diagram of a user matching apparatus according to an embodiment of this application.

According to another aspect of the embodiments of this application, a user matching apparatus for implementing the foregoing user matching method is further provided. As shown in FIG. 11, the apparatus includes:

a first display unit 1102, configured to display a first account in a player team of a virtual game;

a first obtaining unit 1104, configured to obtain account information of at least one second account in the virtual game, the account information including at least one of the following: a login state, a game progress state, and a matching degree with the first account;

a first determining unit 1106, configured to determine a target account from the at least one second account according to the account information; and a second display unit 1108, configured to display team invitation information matching the target account, the team invitation information being used for prompting the first account to invite the target account to join the player team to participate in the virtual game together.

In this embodiment, the user matching apparatus may be, but is not limited to, applied to a game application in which a virtual game is installed. The game application may include, but is not limited to, all games using a thermal weapon for a remote attack, including, but not limited to, a first-person shooting game, a third-person shooting game, and the like. The shooting application may be a multiplayer online battle arena (MOBA for short) game or a single-player game (SPG for short). The types of the game applications may include, but are not limited to, at least one of the following: a two dimension (2D for short) game application, a three dimension (3D for short) game application, a virtual reality (VR for short) game application, an augmented reality (AR for short) game application, and a mixed reality (MR for short) game application. The above is only an example, and is not limited in this embodiment.

In some embodiments, in this embodiment, the game application may be, but is not limited to, a shooting application logged in through the first account and running in a game client, and a virtual operation object is controlled by the first account. In other words, the player logs in to the shooting application running in the game client through the account and controls the virtual operation object. The game screen of the shooting game and other non-game interfaces (such as, a team forming interface, and a preparation interface) are displayed on a display screen of a mobile terminal where the client running the shooting application is located.

In this embodiment, the account information of the at least one second account in the virtual game is obtained when the first account is in any seat of the player team. It can be understood but not limited to that the account information of the at least one second account is obtained when the first account is in a team forming state. The timing of obtaining the account information of the at least one second account may include but is not limited to the time when the first account is in the team forming state or the preset time after the first account is in the team forming state or when an account team forming request actively triggered by the first account is obtained after the first account is in the team forming state.

In this embodiment, the association relationship may be, but is not limited to, understood as the relationship between the accounts due to some virtual element, for example, a friend association relationship (being friends in virtual games or other scenes), a regional association relationship (in the same region), or a team association relationship (in the same team or group).

In this embodiment, the account information includes at least one of the following: a login state, a game progress state, and a matching degree with the first account; The login state may be but is not limited to a state of the account logged in the virtual game, the game progress state may be but is not limited to a running state of the account in the virtual game (such as online, offline, or in-game), and the matching degree with the first account may be but is not limited to a matching degree between the account and the first account in the dimension of target information (such as the friend relationship, whether there is cooperation between configured resources, or whether there is association between historical operation data of the account).

In this embodiment, the target account is an account whose account information meets the team invitation condition in the at least one second account. For example, if account information of second account A and second account C does not meet the team invitation condition, and account information of second account B meets the team invitation condition, the second account B is determined as the target account.

In this embodiment, the team invitation condition may be but is not limited to the preset matching condition under the account information dimension. If a matching condition of an account information is preset as "5-8", when it is obtained that the account information of second account A is "3", because "3" does not match "5-8", it is further determined that the second account A does not meet the team invitation condition. On the contrary, when it is obtained that the account information of second account B is "6", because "6" matches "5-8", it is further determined that the second account B meets the team invitation condition.

In addition, in this embodiment, the account information includes at least one of the following: a login state, a game progress state, and a matching degree with the first account. That is, the account information may be but is not limited to single-dimensional information or multi-dimensional information, and then when the account information is multi-dimensional information, the corresponding team invitation condition may also be but is not limited to a multi-dimensional team invitation condition. For example, assuming that the account information includes the login state and the game progress state, the team invitation condition may be but is not limited to two types of invitation conditions preset for the login state and the game progress state respectively, or may be a type of comprehensive invitation condition preset for information obtained after the login state and the game progress state are integrated.

In this embodiment, in the process of displaying the team invitation information matching the target account, a triggerable virtual button may be set on the interface where the team invitation information is located, and when the virtual button is triggered, a team invitation instruction may be but is not limited to further obtained. The team invitation instruction may be, but not limited to being, used to instruct the client where the target account is located to transmit an invitation request for joining the player team to participate in the virtual game together.

In this embodiment, when the team invitation information includes a plurality of types or a plurality of pieces of invitation information, the plurality of types or plurality of pieces of invitation information are sorted and displayed according to the account information. Alternatively, when there are a plurality of target accounts, the team invitation information matching the target accounts is sorted and displayed according to sorting information carried in the account information. The sorting information may be but is not limited to indicating different sorting rules in the account information of different dimensions, for example, under the dimension of the login state, the sorting rules may include but are not limited to preferentially displaying the login state ranked in front, and the like. In another example, in the dimension of the game progress state, the sorting rules may include but are not limited to sorting and displaying in a manner of the priority of an idle state greater than that of an occupied state greater than that of an offline state. In another example, under the dimension of the matching degree with the first account, the sorting rules may include but are not limited to that a larger matching degree indicates a higher display priority.

In some embodiments, in this embodiment, the determining a target account from at least one second account according to the account information may be, but is not limited to, determining a second account in which a matching degree between account information of the second account and the account information of the target account reaches a user matching condition from the at least one second account as the target account, or may be, but is not limited to, determining a second account in which a matching degree between account information of the second account and overall account information of all accounts in the player team reaches a user matching condition from the at least one second account as the target account. Alternatively, the basis for determining the target account may be, but is not limited to, including the matching with other accounts in the player team in addition to the matching with the first account.

The method of whether the account information meets the team invitation condition is used to determine which associated account is the to-be-invited account, thereby helping players to complete more comprehensive team forming by accounts efficiently and accurately. In addition, because the account information is limited to at least one of the three dimensions of the login state, the game progress state, and the matching degree with the first account, it fully fits the particularity of the virtual game scene, recommends the best teammates for users in the current team forming scene, and improves the user experience.

For specific embodiments, reference may be made to the example shown in the foregoing user matching method, and details are not repeated herein in this example.

According to the embodiment provided by this application, a first account in a player team of a virtual game is displayed; account information of at least one second account in the virtual game is obtained, the account information including at least one of the following: a login state, a game progress state, and a matching degree with the first account; a target account is determined from the at least one second account according to the account information; and team invitation information matching the target account is displayed, the team invitation information being used for prompting the first account to invite the target account to join the player team to participate in the virtual game together. The method of whether the account information meets the team invitation condition is used to determine which associated account is the to-be-invited account, to help players to complete the user matching in time and accurately, thereby achieving the technical effect of improving the comprehensiveness of team forming by accounts.

As a solution, the first determining unit 1104 includes:

a first determining module, configured to: when the account information includes the login state, determine the target account in which the login state is in an offline state when the first account is not in the player team and the login state is in an online state when the first account is in the player team from the at least one second account.

For specific embodiments, reference may be made to the example shown in the foregoing user matching method, and details are not repeated herein in this example.

As a solution, the apparatus further includes:

a hiding module, configured to hide the team invitation information when operation information for the team invitation information is not obtained within a target time period after the team invitation information matching the target account is displayed.

For specific embodiments, reference may be made to the example shown in the foregoing user matching method, and details are not repeated herein in this example.

As a solution, the first determining unit 1104 includes:

a second determining module, configured to: when the account information includes the game progress state, determine at least one candidate account in which the game progress state is an occupied state from the at least one second account a first obtaining module, configured to: when the account information includes the game progress state, obtain a remaining occupation time corresponding to each of the at least one candidate account; and a third determining module, configured to: when the account information includes the game progress state, determine the target account in which the remaining occupation time is less than or equal to a first threshold from the at least one candidate account.

For specific embodiments, reference may be made to the example shown in the foregoing user matching method, and details are not repeated herein in this example.

As a solution, the second display unit 1106 includes:

a first display module, configured to: when the team invitation information includes at least two pieces of invitation information, sort and display the at least two pieces of invitation information according to the remaining occupation time corresponding to the target account matched by each of the at least two pieces of invitation information.

For specific embodiments, reference may be made to the example shown in the foregoing user matching method, and details are not repeated herein in this example.

As a solution, the first determining unit 1104 includes:

a fourth determining module, configured to: when the account information includes the matching degree with the first account, determine the target account in which a resource information matching degree with the first account is greater than or equal to a second threshold from the at least one second account, where the resource information matching degree is used for indicating a matching degree between virtual resources matched by a plurality of accounts, and the matching degree includes the resource information matching degree.

For specific embodiments, reference may be made to the example shown in the foregoing user matching method, and details are not repeated herein in this example.

As a solution, the first obtaining unit 1102 includes:

a second obtaining module, configured to obtain a first virtual resource currently configured by the first account, and obtain a second virtual resource currently configured by each of the at least one second account; and a first calculation module, configured to respectively calculate a matching degree between each second virtual resource and the first virtual resource to obtain a plurality of resource information matching degrees.

For specific embodiments, reference may be made to the example shown in the foregoing user matching method, and details are not repeated herein in this example.

As a solution, the first obtaining unit 1102 includes:

a second obtaining module, configured to obtain a first target virtual resource according to historical operation information of the first account, and obtain a second target virtual resource according to historical operation information of the second account; and a second calculation module, configured to respectively calculate a matching degree between each second target virtual resource and the first target virtual resource to obtain a plurality of resource information matching degrees.

For specific embodiments, reference may be made to the example shown in the foregoing user matching method, and details are not repeated herein in this example.

As a solution, the first determining unit 1104 includes:

a fifth determining module, configured to: when the account information includes the matching degree with the first account, determine the target account in which an interaction information matching degree with the first account is greater than or equal to a third threshold from the at least one second account, where the interaction information matching degree is used for indicating a matching degree between interaction relationships matched by a plurality of accounts, and the matching degree includes the interaction information matching degree.

For specific embodiments, reference may be made to the example shown in the foregoing user matching method, and details are not repeated herein in this example.

As a solution, the second display unit 1106 includes:

a second display module, configured to: when the account information includes at least two of the following: the login state, the game progress state, and the matching degree, when the team invitation information includes at least two pieces of invitation information, sort and display the at least two pieces of invitation information according to the interaction information matching degree matched by each of the at least two pieces of invitation information.

For specific embodiments, reference may be made to the example shown in the foregoing user matching method, and details are not repeated herein in this example.

As a solution, the second display unit 1106 includes:

a third display module, configured to: when the team invitation information includes at least two pieces of invitation information and the account information includes the matching degree, sort and display the at least two pieces of invitation information according to the matching degree matched by each of the at least two pieces of invitation information.

For specific embodiments, reference may be made to the example shown in the foregoing user matching method, and details are not repeated herein in this example.

As a solution, the second display unit 1106 includes:

a fourth display module, configured to display the team invitation information when there is at least one vacant seat in the player team.

For specific embodiments, reference may be made to the example shown in the foregoing user matching method, and details are not repeated herein in this example.

As a solution, the apparatus includes:

a second obtaining unit, configured to: when the account information includes the matching degree with the first account, obtain second attribute information of a virtual character controlled by the at least one second account in the virtual game; and a second determining unit, configured to: when the account information includes the matching degree with the first account, determine a target account from the at least one second account according to the first attribute information, where a matching degree between the second attribute information of the virtual character controlled by the target account in the virtual game and the first attribute information of the virtual character controlled by the first account in the virtual game reaches a fourth threshold, and the matching degree includes a matching degree between the first attribute information and the second attribute information.

For specific embodiments, reference may be made to the example shown in the foregoing user matching method, and details are not repeated herein in this example.

Figure 12:
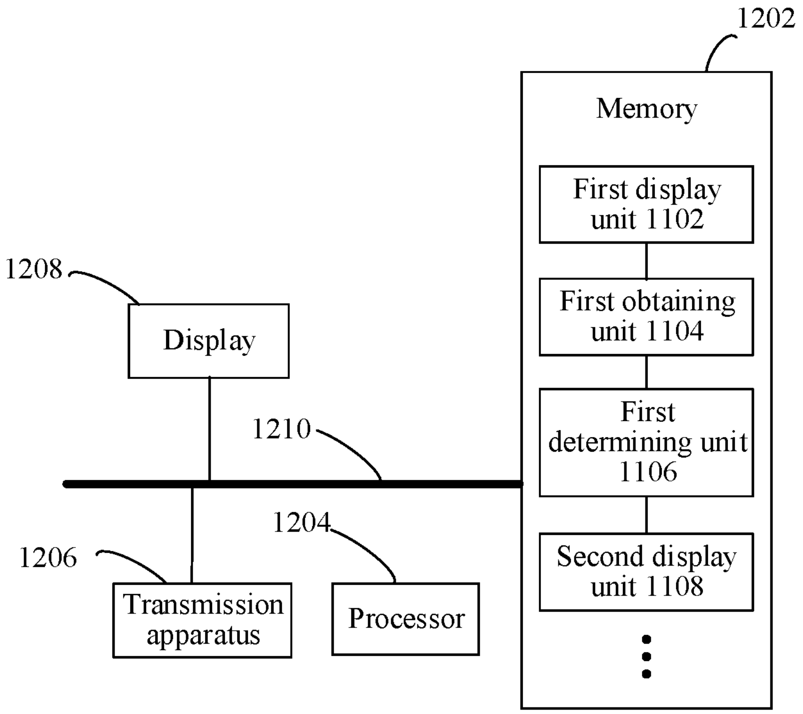
FIG. 12 is a schematic structural diagram of an electronic device according to an embodiment of this application.

According to yet another aspect of the embodiments of this application, an electronic device for implementing the foregoing user matching method is further provided. As shown in FIG. 12, the electronic device includes a memory 1202 and a processor 1204. The memory 1202 stores a computer program, and the processor 1204 is configured to perform the steps in any of the foregoing method embodiments through the computer program.

In this embodiment, the electronic device may be located at least one of a plurality of network devices of a computer network.

In this embodiment, the processor may be configured to perform the following steps through the computer program:

S1. displaying a first account in a player team of a virtual game;

S2. obtaining account information of at least one second account in the virtual game, the account information including at least one of the following: a login state, a game progress state, and a matching degree with the first account;

S3. determining a target account from the at least one second account according to the account information; and S4. displaying team invitation information matching the target account, the team invitation information is used for prompting the first account to invite the target account to join the player team to participate in the virtual game together.

A person of ordinary skill in the art may understand that, the structure shown in FIG. 12 is only schematic. The electronic device may be a terminal device such as a smartphone (such as an Android mobile phone or an iOS mobile phone), a tablet computer, a palmtop computer, a mobile Internet device (MID), or a PAD. FIG. 12 does not limit the structure of the foregoing electronic device. For example, the electronic device may further include more or less components (for example, network interfaces) than those shown in FIG. 12, or has a configuration different from that shown in FIG. 12.

The memory 1202 may be configured to store a software program and a module, for example, a program instruction/module corresponding to the user matching method and apparatus in the embodiments of this application, and the processor 1204 performs various functional applications and data processing by running the software program and the module stored in the memory 1202, that is, implementing the foregoing user matching method. The memory 1202 may include a high-speed random memory, and may also include a non-volatile memory, for example, one or more magnetic storage apparatuses, a flash memory, or another nonvolatile solid-state memory. In some embodiments, the memory 1202 may further include memories remotely disposed relative to the processor 1204, and the remote memories may be connected to a terminal through a network. Examples of the network include, but are not limited to, the Internet, an intranet, a local area network, a mobile communication network, and a combination thereof. The memory 1202 may be specifically, but is not limited to, configured to store information such as the account information, the team invitation condition, and the team invitation information. As an example, as shown in FIG. 12, the memory 1202 may include, but is not limited to, the first display unit 1102, the first obtaining unit 1104, the first determining unit 1106, and the second display unit 1108 in the foregoing user matching apparatus. In addition, the memory 1202 may also include, but is not limited to, other module units in the foregoing user matching apparatus. Details are not repeated in this example.

The transmission apparatus 1206 is configured to receive or transmit data through a network. Specific examples of the network include a wired network and a wireless network. In an example, the transmission apparatus 1206 includes a network interface controller (NIC). The NIC may be connected to another network device and a router through a network cable, to communicate with the Internet or a local area network. In an example, the transmission apparatus 1206 is a radio frequency (RF) module, which communicates with the Internet in a wireless manner.

In addition, the electronic device further includes: a display 1208, configured to display information such as the account information, the team invitation condition, and the team invitation information; and a connection bus 1210, configured to connect the module components in the electronic device.

In other embodiments, the terminal device or server may be a node in a distributed system. The distributed system may be a blockchain system, and the blockchain system may be a distributed system formed by connecting a plurality of nodes in the form of network communication. The nodes may form a peer to peer (P2P for short) network, and any form of computing device, for example, an electronic device such as a server and a terminal, may become a node in the blockchain system by joining the P2P network.

According to one aspect of this application, a computer program product is provided, the computer program product including a computer program/instructions including program code for performing the method shown in the flowchart. In such an embodiment, the computer program may be downloaded and installed from a network through a communication part, and/or installed from a removable medium. When the computer program is executed by a central processing unit (CPU), performs various functions provided by the embodiments of this application are executed.

The sequence numbers of the embodiments of this application are merely for description purpose but do not imply the preference among the embodiments.

Figure 9:
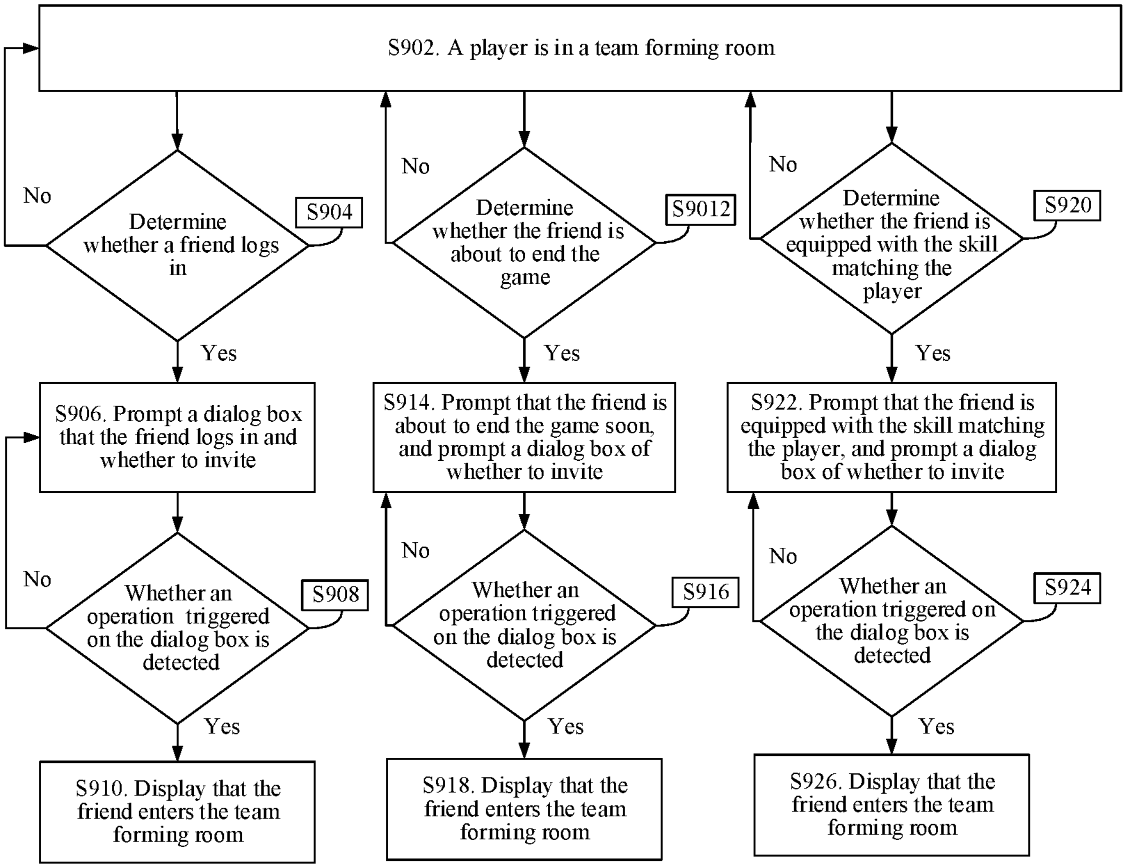
FIG. 9 is a schematic diagram of another user matching method according to an embodiment of this application.

A computer system of the electronic device shown in FIG. 9 is merely an example, and does not constitute any limitation on functions and use ranges of the embodiments of this application.

The computer system includes a CPU, which may perform various suitable actions and processing based on a program stored in a read-only memory (ROM) or a program loaded from a storage part into a random access memory (RAM). The random access memory further stores various programs and data required for system operation. The CPU, the ROM, and the RAM are connected to each other through a bus. An input/output interface (I/O interface) is also connected to the bus.

The following components are connected to the input/output interface: an input part including a keyboard, a mouse, and the like; an output part including a cathode ray tube (CRT), a liquid crystal display (LCD), a speaker, and the like; a storage part including a hard disk, and the like; and a communication part including a network interface card such as a local area network card, a modem, and the like. The communication part performs communication processing through a network such as the Internet. A driver is also connected to the input/output interface as required. A removable medium, such as a magnetic disk, an optical disc, a magneto-optical disk, or a semiconductor memory, is installed on the driver as required, so that a computer program read from the removable medium is installed into the storage part as required.

Particularly, according to the embodiments of this application, the processes described in the method flowcharts may be implemented as computer software programs. For example, this embodiment of this application includes a computer program product, the computer program product includes a computer program carried on a non-transitory computer-readable medium, and the computer program includes program code used for performing the methods shown in the flowcharts. In such an embodiment, the computer program may be downloaded and installed from a network through the communication part, and/or installed from the removable medium. When the computer program is executed by the CPU, the various functions defined in the system of this application are executed.

According to one aspect of this application, a non-transitory computer-readable storage medium is provided. A processor of a computer device reads computer instructions from the computer-readable storage medium, and the processor executes the computer instructions so that the computer device performs the methods provided in the foregoing various implementations.

In this embodiment, the computer-readable storage medium may be configured to store a computer program for performing the following steps:

S1. displaying a first account in a player team of a virtual game;

S2. obtaining account information of at least one second account in the virtual game, the account information including at least one of the following: a login state, a game progress state, and a matching degree with the first account;

S3. determining a target account from the at least one second account according to the account information; and S4. displaying team invitation information matching the target account, the team invitation information is used for prompting the first account to invite the target account to join the player team to participate in the virtual game together.

In this embodiment, a person of ordinary skill in the art can understand that, all or some steps in the methods in the foregoing embodiments may be performed by a program instructing related hardware of a terminal device. The program may be stored in a non-transitory computer-readable storage medium. The storage medium may include: a flash drive, a Read-Only Memory (ROM), a Random Access Memory (RAM), a magnetic disk, an optical disc, and the like.

The sequence numbers of the foregoing embodiments of this application are merely for description purpose but do not imply the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this application essentially, or a part contributing to the related art, or all or a part of the technical solution may be implemented in a form of a software product. The computer software product is stored in a storage medium and includes several instructions for instructing one or more computer devices (which may be a PC, a server, a network device or the like) to perform all or some of steps of the methods in the embodiments of this application.

In the foregoing embodiments of this application, the descriptions of the embodiments have respective focuses. For a part that is not described in detail in an embodiment, refer to related descriptions in other embodiments.

In the several embodiments provided in this application, it is to be understood that, the disclosed client may be implemented in another manner. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by means of some interfaces, units, or modules, and may be electrical or of other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in a form of a software functional unit.

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

In this application, the term “module” or “unit” in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units. Moreover, each module or unit can be part of an overall module or unit that includes the functionalities of the module or unit. The foregoing descriptions are merely exemplary implementations of this application. A person of ordinary skill in the art may further make several improvements and modifications without departing from the principle of this application, and the improvements and modifications fall within the protection scope of this application.

What is claimed is:

1. A teammate matching method, performed by an electronic device, the method comprising:

displaying a team forming interface associated with a first account of a player team of a virtual game;

obtaining a first virtual resource and a first target virtual resource currently configured for the first account according to historical operation information of the first account:

obtaining a second virtual resource and a second target virtual resource currently configured for each of a plurality of second accounts according to historical operation information of the second account and a remaining operation time associated with the second account when the second account is in the middle of playing a second virtual game;

respectively calculating a first matching degree between each second virtual resource and the first virtual resource and a second matching degree between each second target virtual resource and the first target virtual resource to obtain a plurality of resource information matching degrees for the plurality of plurality of second accounts;

obtaining, among the plurality of second accounts, at least one target account whose remaining operation time is less than a first threshold and corresponding resource information matching degree exceeds a second threshold;

displaying at least one invitation interface corresponding to the at least one target account for the first account to invite the target account to join the player team; and in response to the invitation interface being triggered by the first account, transmitting invitation information to the at least one target account to join the player team.

2. The method according to claim 1, further comprising:

stopping displaying the invitation interface when the invitation interface is not triggered within a preset time period after the at least one invitation interface is displayed.

3. The method according to claim 1, wherein the displaying at least one invitation interface comprises:

when there are at least two target accounts, sorting invitation interfaces corresponding to the at least two target accounts according to the remaining occupation times corresponding to the at least two target accounts, and displaying the invitation interfaces according to the sorted order.

4. The method according to claim 1, wherein the displaying at least one invitation interface comprises:

displaying the invitation interface when there is at least one vacant seat in the player team.

5. The method according to claim 1, wherein the virtual resource of the at least one target account and the first account is selected from at least one of the following: a virtual operational role, a virtual subordinate object, a virtual prop, a virtual attribute, and a virtual skill belonging to the virtual operational role.

6. An electronic device, comprising a memory and a processor, the memory storing a computer program that, when executed by the processor, causes the electronic device to perform a teammate matching method including:

displaying a team forming interface associated with a first account of a player team of a virtual game;

obtaining a first virtual resource and a first target virtual resource currently configured for the first account according to historical operation information of the first account;

obtaining a second virtual resource and a second target virtual resource currently configured for each of a plurality of second accounts according to historical operation information of the second account and a remaining operation time associated with the second account when the second account is in the middle of playing a second virtual game;

respectively calculating a first matching degree between each second virtual resource and the first virtual resource and a second matching degree between each second target virtual resource and the first target virtual resource to obtain a plurality of resource information matching degrees for the plurality of plurality of second accounts;

obtaining, among the plurality of second accounts, at least one target account whose remaining operation time is less than a first threshold and corresponding resource information matching degree exceeds a second threshold;

displaying at least one invitation interface corresponding to the at least one target account for the first account to invite the target account to join the player team; and in response to the invitation interface being triggered by the first account, transmitting invitation information to the at least one target account to join the player team.

7. The electronic device according to claim 6, wherein the method further comprises:

stopping displaying the invitation interface when the invitation interface is not triggered within a preset time period after the at least one invitation interface is displayed.

8. The electronic device according to claim 6, wherein the displaying at least one invitation interface comprises:

when there are at least two target accounts, sorting invitation interfaces corresponding to the at least two target accounts according to the remaining occupation times corresponding to the at least two target accounts, and displaying the invitation interfaces according to the sorted order.

9. The electronic device according to claim 6, wherein the displaying at least one invitation interface comprises:

displaying the invitation interface when there is at least one vacant seat in the player team.

10. The electronic device according to claim 6, wherein the virtual resource of the at least one target account and the first account is selected from at least one of the following: a virtual operational role, a virtual subordinate object, a virtual prop, a virtual attribute, and a virtual skill belonging to the virtual operational role.

11. A non-transitory computer-readable storage medium, comprising a stored computer program, the computer program, when executed by a processor of an electronic device, causing the electronic device to perform a teammate matching method including:

displaying a team forming interface associated with a first account of a player team of a virtual game;

obtaining a first virtual resource and a first target virtual resource currently configured for the first account according to historical operation information of the first account;

obtaining a second virtual resource and a second target virtual resource currently configured for each of a plurality of second accounts according to historical operation information of the second account and a remaining operation time associated with the second account when the second account is in the middle of playing a second virtual game;

respectively calculating a first matching degree between each second virtual resource and the first virtual resource and a second matching degree between each second target virtual resource and the first target virtual resource to obtain a plurality of resource information matching degrees for the plurality of plurality of second accounts;

obtaining, among the plurality of second accounts, at least one target account whose remaining operation time is less than a first threshold and corresponding resource information matching degree exceeds a second threshold;

displaying at least one invitation interface corresponding to the at least one target account for the first account to invite the target account to join the player team; and in response to the invitation interface being triggered by the first account, transmitting invitation information to the at least one target account to join the player team.

12. The non-transitory computer-readable storage medium according to claim 11, wherein the virtual resource of the at least one target account and the first account is selected from at least one of the following: a virtual operational role, a virtual subordinate object, a virtual prop, a virtual attribute, and a virtual skill belonging to the virtual operational role.

13. The non-transitory computer-readable storage medium according to claim 11, wherein the method further comprises:

stopping displaying the invitation interface when the invitation interface is not triggered within a preset time period after the at least one invitation interface is displayed.

14. The non-transitory computer-readable storage medium according to claim 11, wherein the displaying at least one invitation interface comprises:

when there are at least two target accounts, sorting invitation interfaces corresponding to the at least two target accounts according to the remaining occupation times corresponding to the at least two target accounts, and displaying the invitation interfaces according to the sorted order.

15. The non-transitory computer-readable storage medium according to claim 11, wherein the displaying at least one invitation interface comprises:

displaying the invitation interface when there is at least one vacant seat in the player team.

* * * * *